No. 778,047. PATENTED DEC. 20, 1904.
G. H. KLUGEL.
DRAFT ATTACHMENT FOR VEHICLES.
APPLICATION FILED JUNE 23, 1904.
NO MODEL.
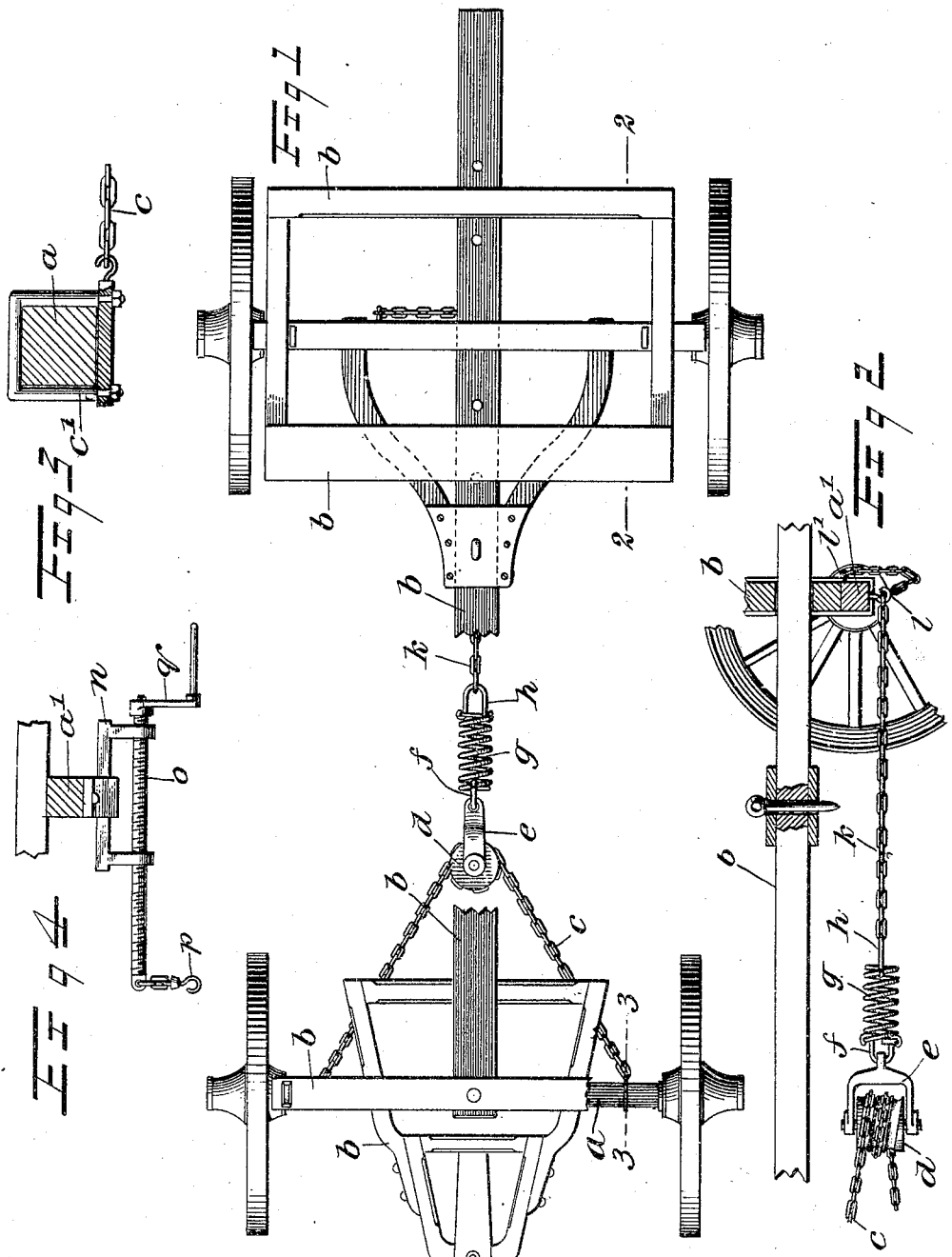
WITNESSES:
INVENTOR
Gustav H. Klugel
BY
ATTORNEYS No. 778,047. Patented December 20, 1904.

UNITED STATES PATENT OFFICE.

GUSDAV H. KLUGEL, OF THIELMAN, MINNESOTA, ASSIGNOR OF ONE-HALF TO FRED H. HEIL, OF THIELMAN, MINNESOTA.

DRAFT ATTACHMENT FOR VEHICLES.

SPECIFICATION forming part of Letters Patent No. 778,047, dated December 20, 1904.

Application filed June 23, 1904. Serial No. 213,903.

*To all whom it may concern:*

Be it known that I, GUSDAV H. KLUGEL, a citizen of the United States, and a resident of Thielman, in the county of Wabasha and State of Minnesota, have invented a new and Improved Draft Attachment for Vehicles, of which the following is a full, clear, and exact description.

My invention relates to a draft attachment for vehicles which may be applied to any kind of a vehicle, but is especially adapted to two-horse wagons and the like.

The principal object of my invention is to provide means for preventing the jar and swinging of the tongue which occurs when one of the wheels meets an obstruction or is raised for any reason.

Further objects will appear in the course of the subjoined description.

Reference is to be had to the accompanying drawings, forming a part of this specification, in which similar characters of reference indicate corresponding parts in all the figures.

Figure 1 is a plan view of a portion of the running-gear of a wagon, with parts broken away and showing a preferred form of my invention. Fig. 2 is a sectional view on the line 2 2 of Fig. 1. Fig. 3 is a sectional view, on an enlarged scale, on the line 3 3 of Fig. 1; and Fig. 4 is a fragmentary sectional view of a modification.

In the drawings, $a$ and $a'$ represent the front and rear axles, respectively, of a vehicle. The several parts of the running-gear are represented by the letter $b$ and the tongue by $b'$.

An important feature of my invention consists in the provision of means for permitting the front axle to be swung upon its pivot and also to be swung vertically without bringing most of the strain upon one of the draft-animals and also for equalizing the strain upon the draft-animals when one tends to take a larger part of the load. This comprises certain elements which are represented in the drawings by a chain $c$ and a grooved pulley $d$. The chain preferably passes once around the pulley, as shown by Fig. 2, and is secured at its two ends to the front axle $a$ by means of a U-bolt $c'$ or the like. It will be obvious that motion imparted to the front axle in any of the directions mentioned above will be provided for by this arrangement and that a large amount of flexibility in the operation of the device is thereby obtained. I also provide means for yieldingly connecting this pulley with the rear axle. This means is represented in the drawings by a yoke $e$, hook $f$, spring $g$, hook $h$, and chain $k$, the spring of course representing the yielding part of the means. The chain is designed to be attached to the rear axle in any desired manner, and I have shown a screw-hook $l$ for that purpose. It will be apparent that the spring $g$ will furnish a yielding tension for the pulley $d$ and that the flexibility of the device is very largely increased by this arrangement. The spring should be strong; but its strength should be varied according to the conditions existing. Of course it should be much stronger when used on a wagon employed for heavy work than when used on a light buggy. When it is desired to tighten the device, the chain is disengaged from the hook, after which it may be pulled backwardly and the proper link attached to the hook $l$. $l'$ is another hook provided for supporting the end of the chain, which otherwise would drag.

In Fig. 4 I have shown a modification comprising a bracket $n$, a screw $o$, a hook $p$, and an operating-crank $q$, the hook being adapted to be attached to the chain $k$.

Of course the screw-hook may be replaced by an eye-screw or any other equivalent device, and it will be understood that various other parts of the apparatus illustrated in the drawings merely show a preferred and practical form of my invention and that I do not wish to be limited to the details thereof.

The device may be used with any kind of vehicle, whether single or double.

From the foregoing description it will be obvious that the device is simple in construction and convenient and efficient in operation; that the construction of one wheel will not have the bad effects now produced by the consequent swinging of the tongue; that it may be easily turned, and that the chain connection may be adjusted when the running-gear is lengthened or shortened in a very small amount of time and without a great deal of labor.

Having thus described my invention, I claim as new and desire to secure by Letters Patent—

1. A running-gear for vehicles, comprising a flexible connection attached to the front axle, and a yielding connection between the flexible connection and the rear axle and adapted to engage the flexible connection at different points.

2. A running-gear, comprising a yieldable connection attached to the rear axle at one point, and to the front axle at two points near the ends thereof.

3. A running-gear comprising a flexible connection attached to the front axle at two points near the ends thereof, and means for connecting said flexible connection to the rear axle.

4. A running-gear for vehicles, having a front axle, a rear axle, a pulley, a flexible connection attached to the front axle and passing around the pulley, and a yielding connection between the pulley and rear axle.

5. A running-gear for vehicles, comprising a front axle, a rear axle, a pulley, a flexible connection attached to the front axle and passing around the pulley, and means for connecting said pulley to the rear axle, comprising a spring and a chain.

6. In a running-gear for vehicles, the combination of a pulley, a chain passing around the pulley and connected at its ends to the front axle of the running-gear, a spring connected to the pulley, a chain connected to the spring, and a hook connected with the vehicle to which any link of the chain may be attached.

7. A running-gear for vehicles, comprising a front axle, a rear axle, a grooved pulley, a chain passing once around the pulley, and the two ends thereof being connected to the front axle near the ends of said axle, a yoke upon which said pulley is journaled, a spring, means for connecting one end of said spring to the yoke, a chain connected to the other end of said spring, and means for connecting the chain at any desired point to the rear axle of the vehicle.

In testimony whereof I have signed my name to this specification in the presence of two subscribing witnesses.

GUSDAV H. KLUGEL.

Witnesses:
FRED H. HEIL,
LOA M. BLOHM.